(12) United States Patent
Okano et al.

(10) Patent No.: US 6,559,875 B2
(45) Date of Patent: May 6, 2003

(54) IMAGE FORMING APPARATUS WITH PIXEL DENSITY BASED LIGHT BEAM CONTROL

(75) Inventors: Keiji Okano, Ibaraki (JP); Shinichi Tsukida, Saitama (JP); Akira Domon, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,009

(22) Filed: Jun. 13, 2001

(65) Prior Publication Data

US 2002/0033873 A1 Mar. 21, 2002

(30) Foreign Application Priority Data

Jun. 13, 2000 (JP) .......................................... 2000-177395
Jun. 12, 2001 (JP) .......................................... 2001-177037

(51) Int. Cl.⁷ .......................... G03G 15/04; G03G 15/00

(52) U.S. Cl. ...................................... 347/131; 347/132

(58) Field of Search ................................. 347/131, 132, 347/133, 129, 251, 252, 253, 254; 358/1.2

(56) References Cited

U.S. PATENT DOCUMENTS

| | | | |
|---|---|---|---|
| 4,910,532 A | * | 3/1990 | Hiraguchi .................... 347/250 |
| 5,146,240 A | * | 9/1992 | Hayashi et al. ............. 347/246 |
| 5,262,801 A | | 11/1993 | Serizawa ..................... 346/108 |
| 5,574,563 A | * | 11/1996 | Hayashi et al. ............. 347/131 |
| 6,104,419 A | * | 8/2000 | Sato ............................ 347/133 |
| 6,219,076 B1 | | 4/2001 | Sato ............................ 347/131 |

FOREIGN PATENT DOCUMENTS

| | | |
|---|---|---|
| JP | 60-31167 | 2/1985 |
| JP | 3-87773 | 4/1991 |
| JP | 4-322270 | 11/1992 |
| JP | 10-274868 | 10/1998 |

* cited by examiner

Primary Examiner—Joan Pendegrass
(74) Attorney, Agent, or Firm—Fitzpatrick, Cella, Harper & Scinto (57) ABSTRACT

An image forming apparatus which includes an image bearing body and a light beam scanner for exposing the image bearing body, which is charged, based on an image signal and forming an electrostatic latent image on the image bearing body. A rise time or a fall time of a light beam emitted from the light beam scanner is controlled when a pixel density of the electrostatic latent image is switched.

10 Claims, 6 Drawing Sheets

FIG. 4C EMBODIMENT 1 (1200dpi, 2×2dot)

FIG. 4B COMPARATIVE EXAMPLE 1 (1200dpi, 2×2dot)

FIG. 4A COMPARATIVE EXAMPLE 0 (600dpi, 1dot)

IMAGE FORMING APPARATUS WITH PIXEL DENSITY BASED LIGHT BEAM CONTROL

BACKGROUND OF THE INVENTION

1. Field of the Invention

The present invention relates to an image forming apparatus of an electrophotographic system and, in particular, to an apparatus capable of switching a pixel density of an electrostatic latent image.

2. Related Background Art

In recent years, image forming apparatus utilizing an electrophotographic system to obtain an image of high quality have been widely used. However, as a way to realize an image of much higher quality, the image forming apparatus provided with improved resolution, that is, high pixel density of 600 and 1,200 or further 2,400 dpi is desired. In order to deal with diversified prints, an apparatus capable of switching the pixel density of the electrostatic latent image by only one image forming apparatus so that the optimum image can be obtained according to a print purpose has been put to practice.

By the way, as a method of setting up an image forming condition according to resolution, in addition to a method of switching a spot size (a size in which the output of an exposing beam is equal to $1/e^2$ of the maximum value), there have been various proposals made such as setting up an effective spot size of the exposing beam according to resolution (Japanese Patent Application Laid-Open No. 60-31167), switching a duty ratio (Japanese Patent Application Laid-Open No. 3-87773), changing exposure strength of the exposing beam according to resolution (Japanese Patent Application Laid-Open No. 4-322270), switching an amount of light by using a high sensitive drum (Japanese Patent Application Laid-Open No. 10-274868) and the like.

However, in the conventional image forming apparatus using such methods, when a switching of the image density is performed in one image forming apparatus, there has been some cases where, when either one of a line width of a letter image and the density of a solid black image or a dot image is adjusted, the image quality of the other becomes varied, thereby leading to a difference in an image repeatability.

That is, usually there are many cases where the image forming condition is matched so that the density of the line width of the letter image and the solid black image becomes the same. However, when the condition is matched in such a way, the dot image becomes thinner in density for high resolution. For example, when the pixel density is changed from 600 dpi to 1,200 dpi, if the image forming condition is matched so that the line width becomes the same, there have been the cases where the density of the dot image becomes thinner for 2×2 dots of 1,200 dpi (equivalent to 1 dot of 600 dpi) than for 1 dot of 600 dpi. On the contrary, when the image forming condition is matched so that the dot image becomes the same, the line width having high resolution becomes thicker.

SUMMARY OF THE INVENTION

An object of the present invention is to provide an image forming apparatus capable of forming the same images in both letters, solid black images and dot images even when a pixel density is changed.

Another object of the present invention is to provide an image forming apparatus comprising an image bearing body and exposing means for exposing the charged image bearing body based on an image signal and forming an electrostatic latent image on the image bearing body, wherein it is possible to switch a pixel density of the electrostatic latent image. Control means controls a responsiveness to the image signal of the exposing means when the pixel density is switched.

Still another object of the present invention will be apparent from the following description.

DETAILED DESCRIPTION OF THE PREFERRED EMBODIMENTS

Hereinafter, embodiments of the present invention will be described in detail with reference to the drawings.

Figure 1:
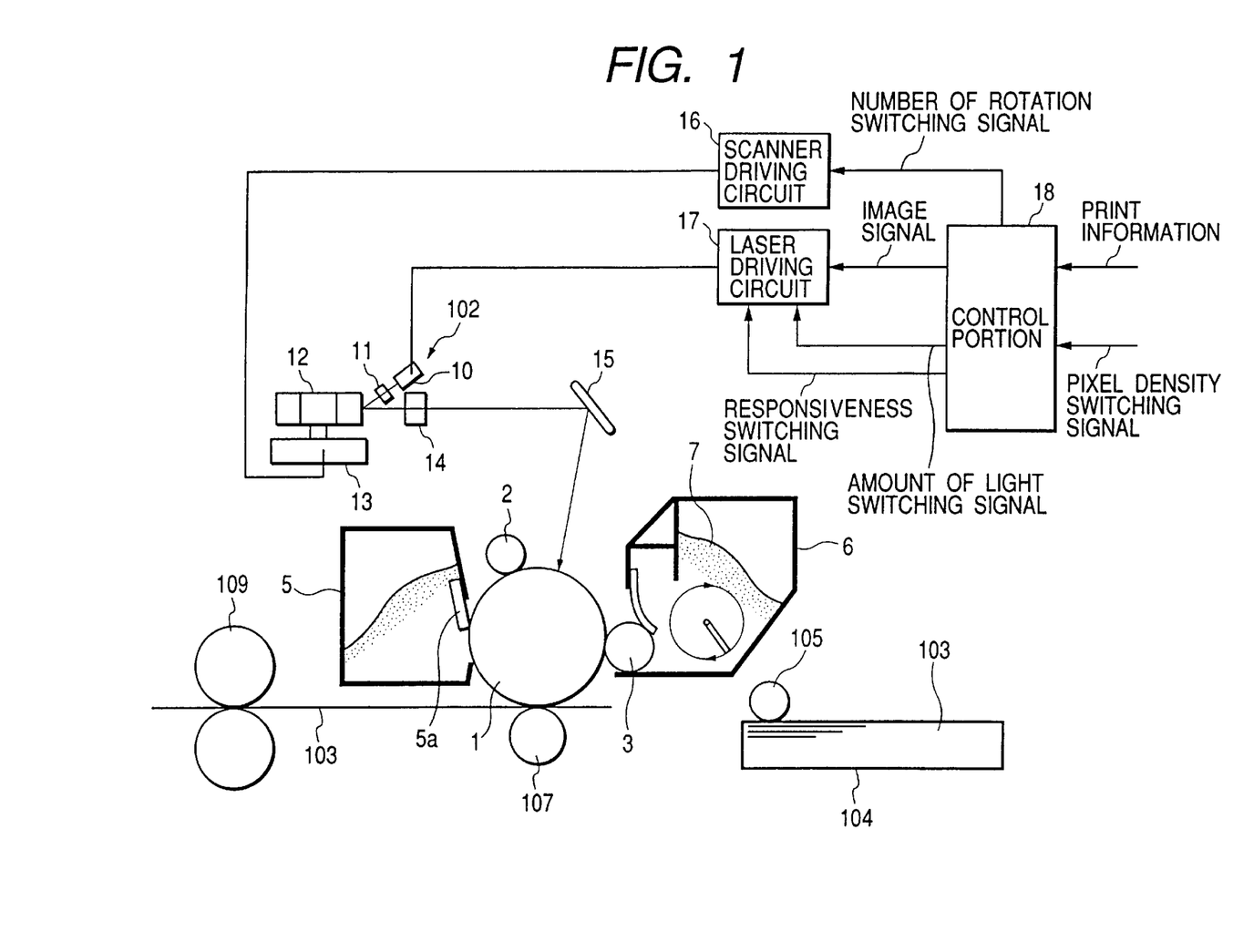
FIG. 1 is a diagram showing a constitution of an image forming apparatus according to a first embodiment of the present invention.

FIG. 1 is a diagram showing a constitution of an image forming apparatus according to a first embodiment of the present invention, and reference numeral 1 denotes a cylindrical photosensitive drum as an image bearing body, reference numeral 2 a charging apparatus for evenly charging a surface of a photosensitive drum 1, reference numeral 102 an exposing apparatus as exposing means for forming an electrostatic latent image on the surface of the photosensitive drum by irradiating a laser beam as light beam.

Reference numeral 6 denotes a developing apparatus for developing the latent image formed by the exposing apparatus 102 by a developer 7, reference numeral 3 a developing sleeve disposed on this developing apparatus, and to this developing sleeve 3, a bias power supply source not shown in which a direct current bias is superposed on an alternating current bias is connected. Reference numeral 107 denotes a transfer apparatus for transferring the image on the photosensitive drum developed by the developer 7 onto a transfer material 103 as a recording medium.

Next, an image forming operation in such an image forming apparatus will be described.

When an image is to be formed, first, after evenly charging the surface of the photosensitive drum 1 by the charging apparatus 2, an electrostatic latent image is formed on the photosensitive drum surface by irradiating a laser beam on the photosensitive drum 1 by the exposing apparatus 102. Note that, in the present embodiment, a charging potential of the photosensitive drum 1 is −700 v and a potential of a solid black portion (a laser exposure portion) is −100 v.

Next, a developer 7 is supplied by the developing apparatus 6 and an adequate developing bias given by a bias supply power source connected to the developing sleeve 3, thereby reverse-developing a laser exposure portion and visualizing the latent image formed on the photosensitive drum 1. Note that, in the present embodiment, a gap between the photosensitive drum 1 and the developing sleeve 3 is about 300 μm, and the direct current bias of −500 v and a rectangular wave Vpp 1,500 v as a developing bias and an alternating current bias of frequency 2,000 Hz are applied.

Next, the image thus visualized on the photosensitive drum 1 by the developer 7 is transferred to a transfer material 103 which is synchronized with the image on the photosensitive drum 1 after being fed from a cassette 104 by a feeding roller 105 and sent to a transfer apparatus 107. After this, the transfer material 103, on which this visualized image was transferred, is conveyed to a fixing apparatus 109, and in this fixing apparatus, the visualized image is fixed either by heat or by pressure, and thus a recorded imaged is formed on the transfer material 103.

Note that, after transferring, the developer 7 not transferred on the transfer material 103 but remained on the photosensitive drum 1 is removed by a cleaning apparatus 5 comprising a blade 5a. After this, the photosensitive drum surface is again charged by the charging apparatus 2 and the above described steps are repeated. Note that, in the present embodiment, a printing speed is, for example, 10 ppm in the case of A4.

By the way, as shown in the drawing, the exposing apparatus 102 for exposing the photosensitive drum 1 comprises a semiconductor laser 10 as a light source, an optical system comprising a collimator lens 11 and the like, a polygon mirror 12 as deflecting means, an fθ lens 14 and a reflection mirror 15, and after a laser beam from the semiconductor laser 10 is reflected by the polygon mirror 12 rotating at a predetermined speed through the optical system, it is allowed to pass through the fθ lens 14 and, after this, it is reflected by the reflection mirror 15 so as to irradiate on the photosensitive drum 1. Note that, in the present embodiment, the spot size (the size in which the output of the exposing beam is equal to $1/e^2$ of the maximum value) of the exposing beam on the drum is taken as 80 μm.

On the other hand, in the drawing, reference numeral 18 denotes a control portion. This control portion 18, after forming an image signal based on the print information inputted from the host computer (not shown), outputs an image signal to a laser drive circuit 17 as a light beam drive means. This drive circuit 17 allows the semiconductor laser 10 to make on-off based on the image signal and allows the laser beam to perform on-off modulation.

This control portion 18, when an image density switching signal is inputted from the host computer for switching the image density, is allowed to change an rotational speed of the photosensitive drum 1 or the rotational speed of the polygon mirror 12 so as to switch the image density and is allowed to switch an emission strength of the semiconductor laser 10 and a rise time of a laser drive current, that is, the rise time of the laser beam. Note that reference numeral 16 denotes a scanner drive circuit as deflection drive means for controlling the number of revolutions of the polygon mirror 12 through a polygon mirror drive circuit 13.

Figure 2:
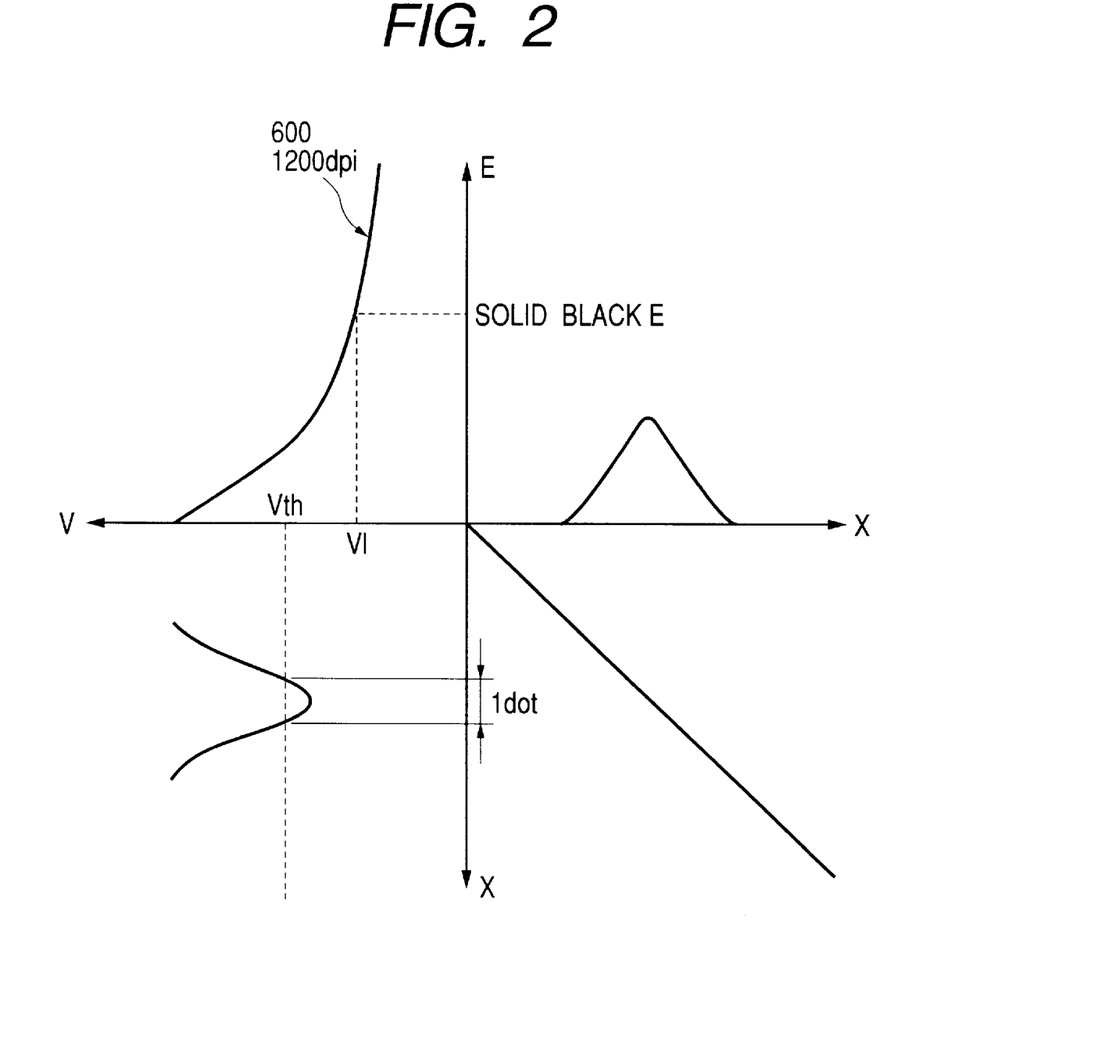
FIG. 2 is a diagram showing a relationship among an amount of light distribution of an exposing beam, a sensitivity characteristic of a photosensitive drum and an electrostatic latent image to be formed on the photosensitive drum.

By the way, FIG. 2 is a diagram showing a relationship among an amount of light distribution of the exposing beam, a sensitivity characteristic of the photosensitive drum 1 and the electrostatic latent image formed on the photosensitive drum.

Here, in the same drawing, the first quadrant is the amount of light distribution of the exposing beam, in which the axis of abscissas represents a location x and the axis of ordinates represents the amount of light E. The second quadrant is the sensitivity characteristic of the photosensitive drum 1, in which the axis of ordinates represent the amount of light E and the axis of abscissas represents a potential V. The third quadrant is the potential distribution of the electrostatic latent image in which the sensitivity characteristic of the photosensitive drum is added with the amount of light distribution of the exposing beam, in which the axis of abscissas represents the potential V and the axis of ordinates represents the location x.

As shown in the third quadrant, for example, for the potential distribution at the time when 1 dot of 600 dpi is exposed, a range below Vth is developed. Note that, though only 1 dot of 600 dpi is shown in the same drawing, a line image and a solid black can be similarly handled.

Figure 3A:
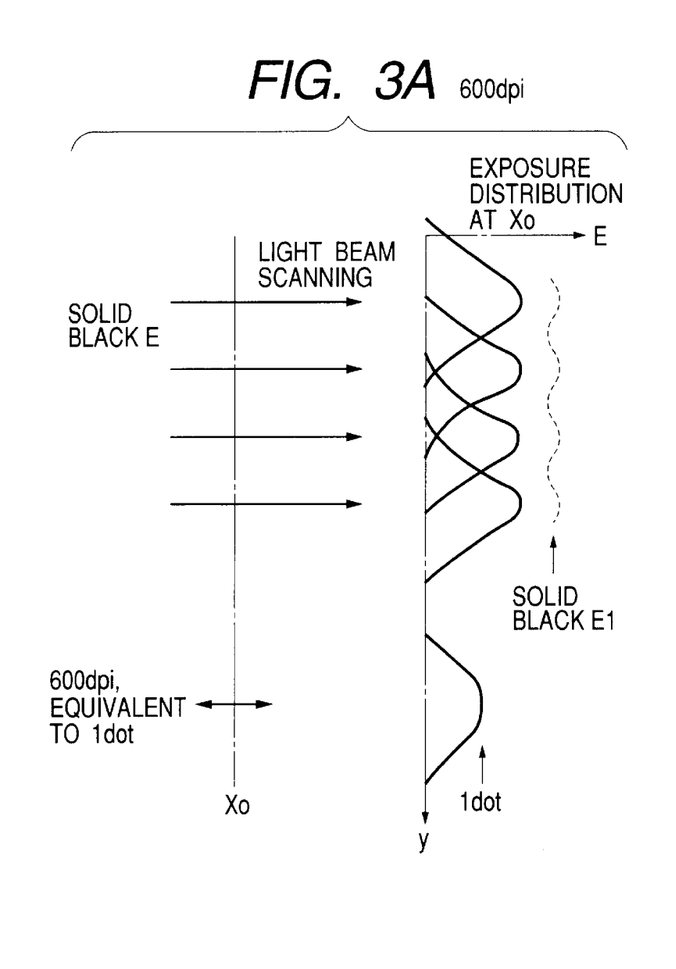
FIGS. 3A and 3B are diagrams showing a solid black exposure and 1 dot exposure distribution for 600 dpi and 1,200 dpi when a laser responsiveness to an image signal is 100%.
Figure 3B:
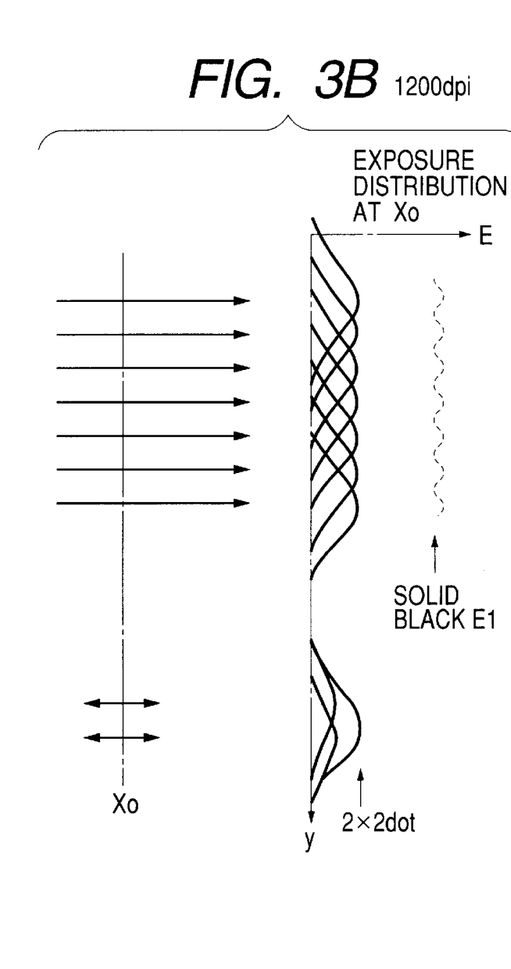

On the other hand, FIG. 3A and FIG. 3B are diagrams showing a solid black exposure and a 1 dot exposure distribution for 600 dpi and 1,200 dpi at the time when a responsiveness of the semiconductor laser 10 to the image signal is 100%. As is evident from these drawings, when the E-V is approximately the same for 600 dpi and 1,200 dpi, in order to make the line width and the solid density identical for 600 dpi and 1,200 dpi, it is sufficient only to make a solid black potential E1 identical for 600 dpi and 1,200 dpi and, in this case, it is necessary to make the amount of light on the drum surface identical for 600 dpi and 1,200 dpi.

Since a letter image is sometimes formed by a font of about 4 to 10 dots, 600 dpi, it becomes identical with the solid black in the amount of light. For this reason, in order to switch from 600 dpi to 1,200 dpi so that the amount of light on the drum surface of the solid black is made the same, it is necessary to make the laser exposure amount of light ½ times 600 dpi because the scanning line is two times in case of 1,200 dpi. Note that, in the present embodiment, the rotation of the polygon mirror 12 is doubled so as to perform an image forming from 600 dpi to 1,200 dpi.

Figure 4A:
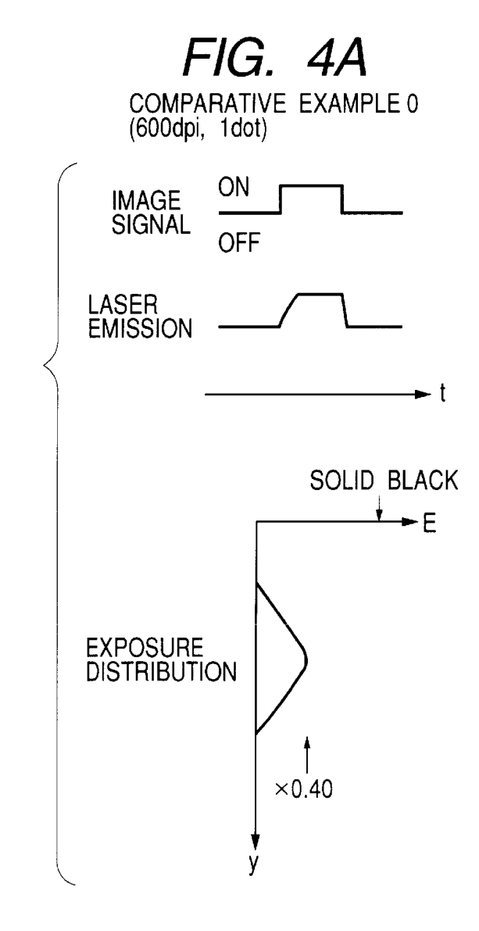
FIGS. 4A, 4B and 4C are diagrams showing a laser emission time at the time when an image equivalent to 600 dpi, 1 dot is exposed.
Figure 4B:
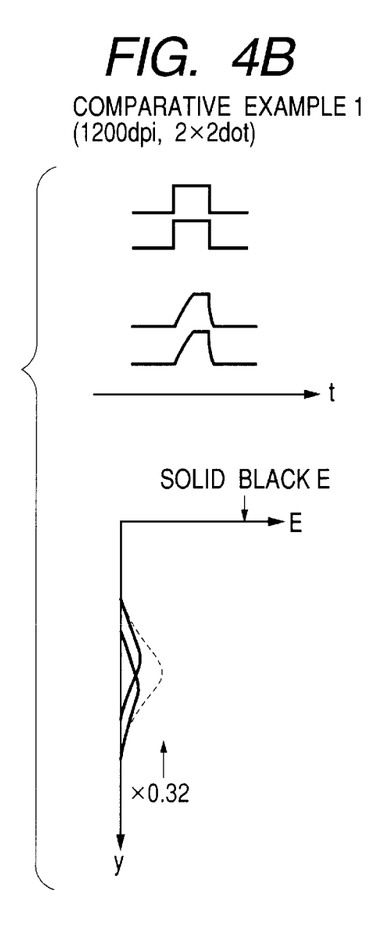
Figure 4C:
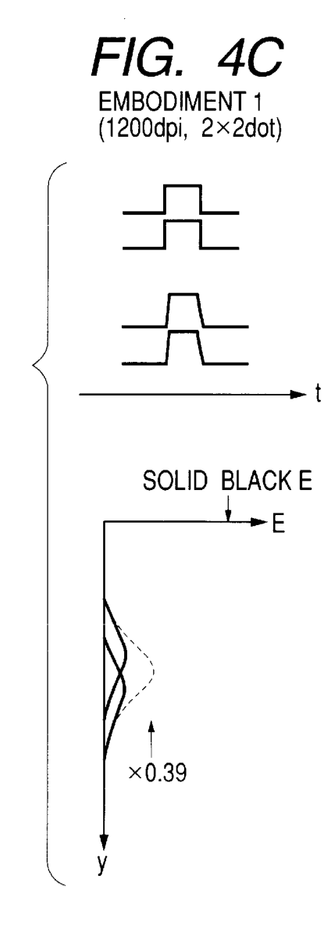

FIGS. 4A to 4C are diagrams showing the laser emission time when the image equivalent to 600 dpi, 1 dot is exposed. Here, since the rotation of the polygon mirror 12 is doubled in the case of 1,200 dpi, it is necessary to shorten the emission time of the semiconductor laser 10 when the dot is exposed. Here, though the emission time when the dot is formed is decided by a process speed, the number of faces of the polygon mirror 12 and the number of rotations, in the case of the present embodiment, the emission time is 60 nsec for 600 dpi, 1 dot or 30 nsec×2 lines for 1,200 dpi, 2×2 dots.

Note that the semiconductor laser 10 has actually a rise time and the longer the rise time of the laser beam for this image signal is, the smaller an amount of the emission light is for 1 dot by that much. Hence, the ratio of the rise time of the laser beam in the case of 1,200 dpi becomes so long that it cannot be ignored. For the above described reason, the amount of light of 1 dot is reduced for 1,200 dpi. And for the same reason, comparing with a 1 dot horizontal line, a vertical line and a diagonal line become weak in the repeatability.

If a delay in the emission time of the semiconductor laser 10 for the image signal can be made zero, a difference in the dot repeatability attributable to the switching of the pixel density can be made small. Actually, however, there are irregularities in the characteristic of the laser drive circuit 17, the V-I characteristic of the semiconductor laser 10 and the like and, therefore, it is hard to follow the ideal. Consequently, in case of switching resolution from 600 dpi to 1,200 dpi in such a manner, it is preferable to make the laser exposure amount of light by half in the case of 600 dpi and shorten the rise time of the laser for the image signal.

In the present embodiment, in case of switching the pixel density from 600 dpi to 1,200 dpi, as shown in FIG. 1, the control portion 18 outputs the number of revolutions switching signal to the scanner drive circuit 16 and, by this number of revolutions switching signal, the scanner drive circuit 16 doubles the rotational speed of the polygon mirror 12 through the polygon mirror drive circuit 13.

The control portion 18 outputs a responsiveness switching signal to the laser drive circuit 17 and, by this responsiveness switching signal, the laser drive circuit 17 adjusts C (capacitance) and R (resistance) of the laser drive circuit 17 and makes the rise time ¼ times in the case of switching the pixel density from 600 dpi to 1,200 dpi.

Further, in the present embodiment, the control portion 18 outputs, when the E-V characteristic of the photosensitive drum differs at the pixel density switching time, an amount of light switching signal to the laser drive circuit 17 and, by this amount of light switching signal, the laser drive circuit 17 switches the emission strength of the semiconductor laser 10 so that the solid black amount of light on the drum surface become approximately the same as the emission strength.

By the way, the following table shows comparative examples and the example of the present embodiment. Hereinafter, the effect of the present embodiment will be described with reference to this table.

TABLE 1

|  | Comparative example 0 | Comparative example 1 | Example 1 |
|---|---|---|---|
| Pixel density | 600 dpi | 1,200 dpi | 1,200 dpi |
| Drum surface Solid black E ($\mu J/cm^2$) | 0.4 | 0.4 | 0.4 |
| 600 dpi 1 dot equivalent signal time (nsec) | 60 | 30 × 2 lines | 30 × 2 lines |
| Laser rise time (nsec) | 6 | 6 | 1.5 |
| Solid black potential Vl (V) | −100 | −100 | −100 |
| 600 dpi 1 dot equivalent-peak amount of light (solid taken as 1) | 0.4 | 0.32 | 0.39 |
| Solid black density | 1.45 | 1.45 | 1.45 |
| Line width (equivalent to 600 dpi 4 dots) $\mu m$ | 180 | 180 | 180 |
| 1 dot (equivalent to 600 dpi) | good | fair | good |
| 1 dot diagonal line (1,200 dpi) | — | fail | fair |

(Comparative Example 0)

With the present comparative example taken as O, the pixel density was taken as 600 dpi and the drum surface amount of light of the solid black as 0.4 $\mu J/cm^2$. On this occasion, the peak amount of light of 600 dpi, 1 dot has the emission time of 90% for the signal, and the peak amount of light of 600 dpi, 1 dot is 0.40 times the peak amount of light of the solid black (see FIG. 4A).

(Comparative Example 1)

With the present comparative example taken as 1, the pixel density was taken as 1,200 dpi and the drum surface amount of light of the solid black as 0.4 $\mu J/cm^2$. On this occasion, because the peak amount of light of 1,200 dpi, 2×2 dots has the emission time of 80% for the signal, it is 0.32 times the peak amount of light of the solid black (see FIG. 4B).

Next, the example of the present embodiment will be described.

EXAMPLE 1

In the present example 1, the rise time of the semiconductor laser 10 is taken as the same as that of the comparative example, that is, 6 nsec when the pixel density is 600 dpi, and ¼ times the comparative example, that is, 1.5 nsec when the pixel density is 1,200 dpi. On this occasion, since the emission time for the signal is 95%, the peak amount of light equivalent to 600 dpi, 1 dot is 0.39 times the peak amount of light of the solid black.

Therefore, the repeatability of the line width, the solid density and 2×2 dots (equivalent to 1 dot of 600 dpi) of 1,200 dpi is approximately the same as the repeatability at 600 dpi. Further, comparing with the comparative example 1, 1 dot diagonal line of 1,200 dpi is also repeatable.

In this way, by changing the rise of the semiconductor laser 10 at the same time resolution is switched, when the pixel density is switched by one image forming apparatus, approximately the same line width and the dot repeatability can be obtained.

Note that while, in the present embodiment, the switching of the light beam rise time to switch a responsibility of the exposing apparatus 102 has been described, the present invention is not limited to this, but the responsibility may be switched by switching a light beam fall time.

Figure 5:
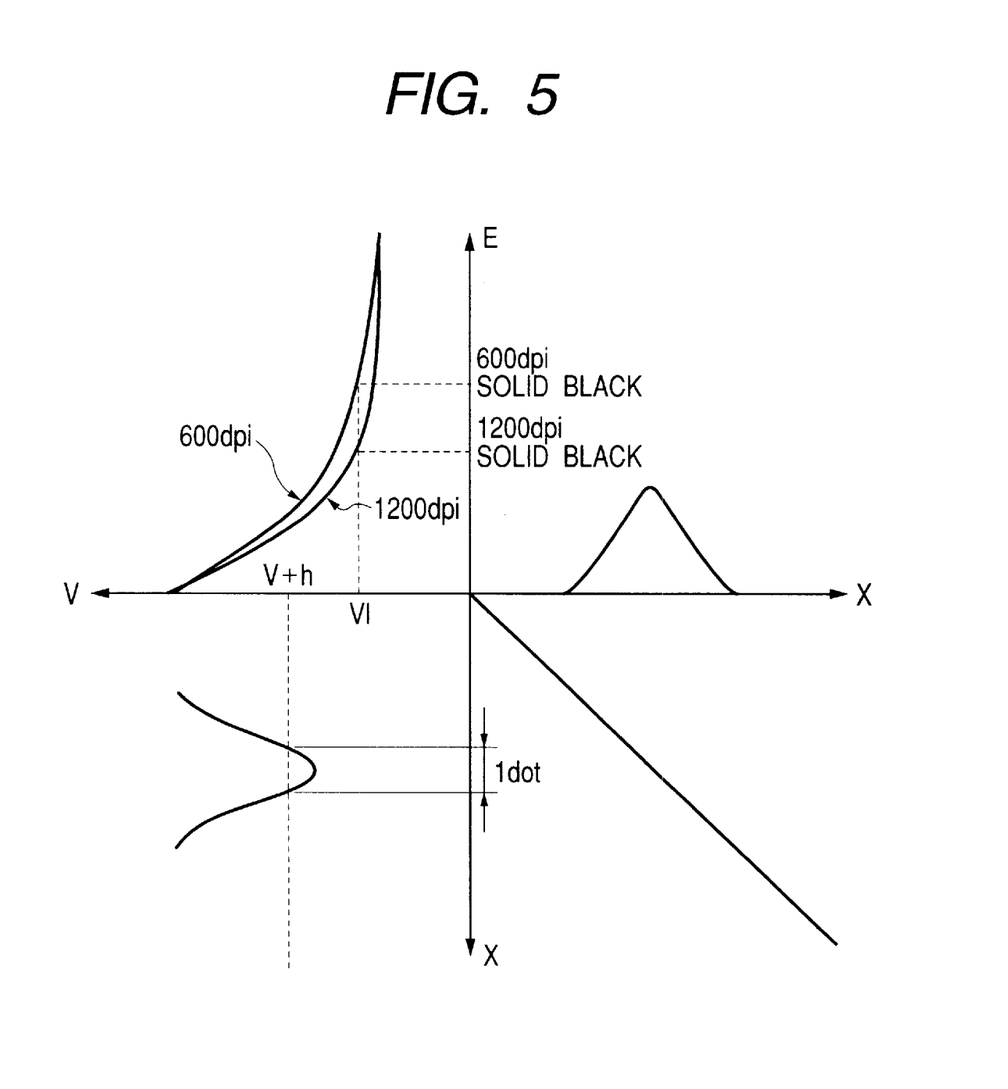
FIG. 5 is a diagram showing a relationship among the amount of light distribution of the exposing beam when E-V characteristics of a photosensitive drum are different at a switching time of an pixel density, the sensitivity characteristic of the photosensitive drum and an electrostatic latent image formed on the photosensitive drum.

On the other hand, FIG. 5 is a diagram showing a relationship among the amount of light of the exposing beam, the sensitivity characteristic of the photosensitive drum and the electrostatic latent image formed on the photosensitive drum when the E-V characteristic of the photosensitive drum at the switching time of the pixel density differs depending on the photosensitive drum 1, the process speed and the spot size of the light beam.

When the E-V characteristic of the photosensitive drum at the switching time of the pixel density differs in such a manner, as shown in the drawing, the potential is sometimes reduced for the same solid black in the case of 1,200 dpi. In this case, in the present embodiment, the emission amount of the semiconductor laser 10 is changed so that the solid black potential on the drum surface becomes approximately the same, and the rise time of the laser drive current is also changed by adjusting C (capacitance) and R (resistance) of the laser drive circuit 17. For example, in case of switching from 600 dpi to 1,200 dpi, the rise time is made ⅛ times.

When the E-V characteristic of the photosensitive drum 1 at the switching time of the pixel density differs in such a manner, the emission amount of the semiconductor laser 10 is changed so as to be the same as the solid black potential, and by changing a laser responsiveness, the same effect as the previously described example 1, that is, approximately the same line width and the dot repeatability can be obtained.

By the way, in the explanation made so far, while the image forming apparatus of the constitution in which the developing apparatus 6 and the photosensitive drum 1 are made at least separate entities has been described, the present invention is not limited to this, but each of these apparatuses 1 and 6 may be disposed inside a replaceable integrated cassette.

Figure 6:
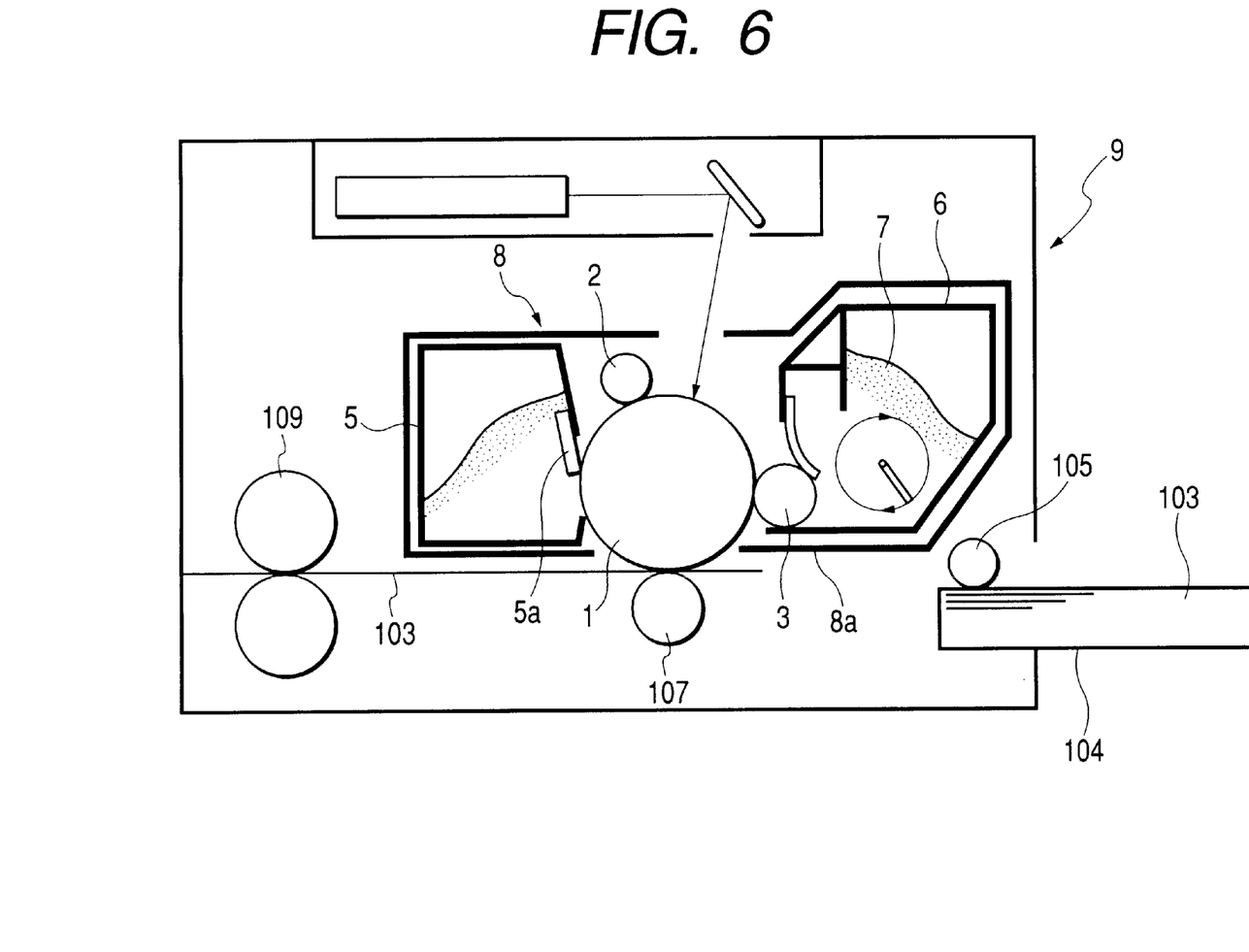
FIG. 6 is a view showing a constitution of the image forming apparatus according to a second embodiment of the present invention.

FIG. 6 is a view showing the constitution of the image forming apparatus according to a second embodiment of the present invention. Note that, in the same drawing, the same reference numerals as those of FIG. 1 denote the same or the equivalent components.

In the drawing, reference numeral 8 denotes a process cartridge detachably attachable to the image forming apparatus 9. This process cartridge 8 unifies the developing apparatus 6, the photosensitive drum 1, the cleaning apparatus 5 and the charging apparatus 2 by an armor 8a and makes them as an integrated cartridge. Note that this integrated cartridge is designed so that, when the toner 7 is used up, the other apparatuses also come to expire their life approximately at the same time.

Consequently, users can always obtain stable images as far as the toner is available inside the cartridge, and there is an advantage in that the replacement of the cartridge can be easily performed since it is an integrated type. That is, there is an advantage in that, in addition to the image stability and easy maintenance which are also an advantage of the cartridge, the image of much higher quality can be obtained.

As described above, the present invention can provide an image forming apparatus capable of forming identical images for both letters and solid black images and dot images by switching a responsiveness to the image signal of the exposing means and exposure strength as occasion demands when the pixel density of the electrostatic latent image is switched.

While the present invention has been described with respect to what is presently considered to be the examples, it is to be understood that the invention is not limited to the disclosed examples. To the contrary, the invention is intended to cover any variations possible within the scope and the spirit of the present invention.

What is claimed is:

1. An image forming apparatus, comprising:

an image bearing body;

light beam scanning means for exposing said image bearing body, which is charged, based on an image signal and forming an electrostatic latent image on said image bearing body; and control means for controlling a rise time or a fall time of a light beam emitted from said light beam scanning means when a pixel density of the electrostatic latent image is switched.

2. An image forming apparatus according to claim 1, wherein said control means shortens the rise time or the fall time of the light beam when the pixel density becomes high.

3. An image forming apparatus according to claim 1, wherein said control means controls exposure strength of said light beam scanning means when the pixel density is switched.

4. An image forming apparatus according to claim 3, wherein said control means reduces an amount of light of an emission light of the light beam when the pixel density becomes high.

5. An image forming apparatus according to claim 1, wherein said light beam scanning means comprises a light source for emitting the light beam and deflecting means for deflecting the light beam emitted from said light source, and said deflecting means is rotatable.

6. An image forming apparatus according to claim 5, further comprising light beam drive means for driving the light beam emitted from said light source, wherein said control means outputs a rise time switching signal or a fall time switching signal to said light beam drive means.

7. An image forming apparatus according to claim 6, wherein said control means outputs an image signal to said light beam drive means.

8. An image forming apparatus according to claim 6, wherein said control means outputs a switching signal of an amount of light of the light beam to said light beam drive means.

9. An image forming apparatus according to claim 6, further comprising deflecting drive means for driving said deflecting means, wherein said control means outputs a switching signal of a number of rotations of said deflecting means to said deflecting drive means.

10. An image forming apparatus according to claim 1, further comprising a process cartridge, including at least said image bearing body, detachably attachable to a main body of said apparatus.

* * * * *